United States Patent
Xiang (10) Patent No.: US 9,467,932 B2
(45) Date of Patent: Oct. 11, 2016

(54) ACCESS CONTROL METHOD FOR WIFI DEVICE AND WIFI DEVICE

(71) Applicant: Huawei Device Co., Ltd., Shenzhen (CN)

(72) Inventor: Chao Xiang, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 165 days.

(21) Appl. No.: 14/145,234

(22) Filed: Dec. 31, 2013

(65) Prior Publication Data

US 2014/0169354 A1 Jun. 19, 2014

Related U.S. Application Data

(63) Continuation of application No. PCT/CN2013/084904, filed on Oct. 9, 2013.

(30) Foreign Application Priority Data

Dec. 18, 2012 (CN) .......................... 2012 1 0551879

(51) Int. Cl.
  *H04W 48/16* (2009.01)
  *H04W 12/08* (2009.01)
  *H04L 29/06* (2006.01)

(52) U.S. Cl.
  CPC ............ *H04W 48/16* (2013.01); *H04L 63/101* (2013.01); *H04W 12/08* (2013.01); *H04L 63/0263* (2013.01)

(58) Field of Classification Search
  CPC .................................................. H04W 48/16
  USPC ....................................................... 370/338
  See application file for complete search history.

(56) References Cited

U.S. PATENT DOCUMENTS 7,316,031 B2 * 1/2008 Griffith ............... H04L 63/1408
                                                              709/223
8,000,698 B2 * 8/2011 Wolman .............. H04L 63/1408
                                                              455/410

(Continued)

FOREIGN PATENT DOCUMENTS

CN      101459728 A    6/2009
CN      101491008 A    7/2009

(Continued)

OTHER PUBLICATIONS

Foreign Communication From a Counterpart Application, PCT Application No. PCT/CN2013/084904, English Translation of International Search Report dated Jan. 9, 2014, 2 pages.

(Continued)

*Primary Examiner* — Rasheed Gidado
(74) *Attorney, Agent, or Firm* — Conley Rose, P.C.; Grant Rodolph; William H. Dietrich (57) ABSTRACT

An access control method for a wireless fidelity (WiFi) device and a WiFi device. The method includes: receiving, at a user layer of the WiFi device, an access request for accessing the WiFi device based on a service set identifier (SSID), where the access request includes a request for accessing a management interface web user interface (WEBUI) of the WiFi device; determining, at the user layer of the WiFi device, whether a tag of the received access request is the same as one of tags that are preset for SSIDs forbidden to access the WiFi device; if the determination result is positive, rejecting the access request; if the determination result is negative, accepting the access request. In this way, access control of a WiFi device can be implemented in a simple manner.

10 Claims, 4 Drawing Sheets

(56) References Cited

U.S. PATENT DOCUMENTS

| | | | | |
|---|---|---|---|---|
| 8,639,233 | B1* | 1/2014 | Xue | H04W 36/0022 |
| | | | | 370/338 |
| 8,832,796 | B2* | 9/2014 | Miyake | G06F 21/6218 |
| | | | | 370/338 |
| 9,220,007 | B2* | 12/2015 | Remaker | H04L 63/0421 |
| 2003/0172109 | A1 | 9/2003 | Dalton et al. | |
| 2005/0185626 | A1* | 8/2005 | Meier | H04L 12/4641 |
| | | | | 370/338 |
| 2007/0159997 | A1 | 7/2007 | Tsai et al. | |
| 2007/0258395 | A1* | 11/2007 | Jollota | A61B 5/14532 |
| | | | | 370/310 |
| 2009/0158400 | A1 | 6/2009 | Miyake | |
| 2009/0168735 | A1* | 7/2009 | Mizukoshi | H04W 12/10 |
| | | | | 370/338 |
| 2009/0187983 | A1* | 7/2009 | Zerfos | H04L 63/0823 |
| | | | | 726/10 |
| 2012/0127942 | A1 | 5/2012 | Cook et al. | |

FOREIGN PATENT DOCUMENTS

| | | |
|---|---|---|
| CN | 101895875 A | 11/2010 |
| CN | 102547684 A | 7/2012 |
| CN | 102612116 A | 7/2012 |
| EP | 2480044 A1 | 7/2012 |
| JP | 2004529408 A | 9/2004 |
| JP | 2007189658 A | 7/2007 |
| JP | 2009146193 A | 7/2009 |
| JP | 20090543381 A | 12/2009 |
| WO | 2008004495 A1 | 1/2008 |

OTHER PUBLICATIONS

Foreign Communication From a Counterpart Application, PCT Application No. PCT/CN2013/084904, Written Opinion dated Jan. 9, 2014, 3 pages.

Foreign Communication From a Counterpart Application, European Application No. 13807886.0, Extended European Search Report dated Apr. 8, 2015, 8 pages.

Partial English Translation and Abstract of Japanese Patent Application No. JP2004529408A, Jul. 29, 2015, 97 pages.

Partial English Translation and Abstract of Japanese Patent Application No. JP2007189658A, Jul. 29, 2015, 23 pages.

Partial English Translation and Abstract of Japanese Patent Application No. JP2009146193A, Jul. 29, 2015, 47 pages.

Partial English Translation and Abstract of Japanese Patent Application No. JP2009543381A, Jul. 29, 2015, 97 pages.

Foreign Communication From a Counterpart Application, Chinese Application No. 2014-552514, Chinese Office Action dated Jun. 30, 2015, 3 pages.

Foreign Communication From a Counterpart Application, Chinese Application No. 2014-552514, English Translation of Chinese Office Action dated Jun. 30, 2015, 3 pages.

Foreign Communication From A Counterpart Application, Chinese Application No. 201210551879.X, Chinese Search Report dated Jun. 1, 2016, 2 pages.

Foreign Communication From A Counterpart Application, Chinese Application No. 201210551879.X, Chinese Office Action dated Jun. 15, 2016, 4 pages.

\* cited by examiner

ACCESS CONTROL METHOD FOR WIFI DEVICE AND WIFI DEVICE

CROSS-REFERENCE TO RELATED APPLICATIONS

This application is a continuation of International Application No. PCT/CN2013/084904, filed on Oct. 9, 2013, which claims priority to Chinese Patent Application No. 201210551879.X, filed on Dec. 18, 2012, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to the field of wireless communications, and in particular, to an access control method for a wireless fidelity (WiFi) device and a WiFi device.

BACKGROUND OF THE INVENTION

With the popularity of WiFi products, users' requirements for WiFi access increase continuously. When WiFi supports a multi service set identifier (SSID) (Multi-SSID), rights of each SSID need to be managed, for example, a user of a terminal associated with SSID1 is permitted to log in to a management interface web user interface (WEBUI) of the WiFi and configure parameters of the terminal, but a user of a terminal associated with SSID2 is not permitted to access the management interface WEBUI of the WiFi.

Currently, a solution for managing the Multi-SSID is as follows:

When a user of a terminal initiates a request for accessing the WEBUI, an application module in a WiFi product obtains, according to a mapping relationship between an Internet Protocol (IP) address and a Media Access Control (MAC) address reported by a Dynamic Host Configuration Protocol (DHCP) module, a MAC address of the user of the terminal that currently initiates the request for accessing the WEBUI, invokes a WiFi query interface to obtain a MAC address list of users of terminals associated with SSIDs (for example, SSID2) that are forbidden to access the WEBUI, and determines whether the MAC address list includes the MAC address of the user of the terminal that currently initiates the WEBUI access request; if the MAC address list includes the MAC address, the application module rejects the user request for accessing the WEBUI; if the MAC address list does not include the MAC address, the application module responds to the user request for accessing the WEBUI.

However, this solution still has the following disadvantages:

Each time a user attempts to access the WEBUI, an IP/MAC mapping table always needs to be queried; the WiFi query interface needs to be invoked to obtain the MAC address list of all users of terminals associated with SSIDs (for example, SSID2) that are forbidden to access the WEBUI; and whether the MAC address list includes the MAC address of the user of the terminal that currently initiates the request for accessing the WEBUI needs to be determined, so that the efficiency is low.

SUMMARY OF THE INVENTION

Embodiments of the present invention provide an access control method for a WiFi device and a WiFi device, so that access control of the WiFi device can be implemented in a simple manner.

According to a first aspect, the present invention provides an access control method for a WiFi device, which may include: receiving, at a user layer of the WiFi device, an access request for accessing the WiFi device based on a SSID, where the access request includes a request for accessing a management interface WEBUI of the WiFi device; and determining, at the user layer of the WiFi device, whether a tag of the received access request is the same as one of tags that are preset for SSIDs forbidden to access the WiFi device; if the determination result is positive, rejecting the access request; if the determination result is negative, accepting the access request.

With reference to the first aspect, in a first possible implementation manner, before the receiving, at a user layer of the WiFi device, an access request for accessing the WiFi device based on a SSID, the method may further include: obtaining, at a kernel layer of the WiFi device and in a Multi-SSID, index values of interfaces that correspond to the SSIDs forbidden to access the WiFi device; when receiving, at the kernel layer of the WiFi device, an access request for accessing the WiFi device based on a SSID, determining whether an index value of an interface that corresponds to the SSID on which the access request is based matches one of the index values of the interfaces that correspond to the SSIDs forbidden to access the WiFi device; and if the determination result is positive, adding, at the kernel layer of the WiFi device, a preset tag to the access request based on the SSID, and sending the access request with the preset tag added to the user layer of the WiFi device; if the determination result is negative, not adding, at the kernel layer of the WiFi device, the preset tag to the access request based on the SSID, and sending the access request without the preset tag added to the user layer of the WiFi device.

With reference to the first aspect or the first possible implementation manner of the first aspect, in a second possible implementation manner, before the receiving, at a user layer of the WiFi device, an access request for accessing the WiFi device based on a SSID, the method further includes: setting, at the user layer of the WiFi device, corresponding tags for the SSIDs forbidden to access the WiFi device.

According to a second aspect, the present invention provides a WiFi device, which may include: a first receiving module configured to receive, at a user layer of the WiFi device, an access request for accessing the WiFi device based on a SSID, where the access request includes a request for accessing a management interface WEBUI of the WiFi device; a first determining module configured to determine, at the user layer of the WiFi device, whether a tag of the received access request is the same as one of tags that are preset for SSIDs forbidden to access the WiFi device; and a first access control module configured to: when the determination result of the first determining module is positive, reject the access request; when the determination result of the first determining module is negative, accept the access request.

With reference to the second aspect, in a first possible implementation manner, the WiFi device provided by the present invention may further include: an obtaining module configured to obtain, at a kernel layer of the WiFi device and in a Multi-SSID, index values of interfaces that correspond to the SSIDs forbidden to access the WiFi device; a second receiving module configured to receive, at the kernel layer of the WiFi device, an access request for accessing the WiFi device based on a SSID; a second determining module configured to: when the second receiving module receives the access request based on the SSID for accessing the WiFi device, determine whether an index value of an interface that corresponds to the SSID on which the access request is based matches one of the index values of the interfaces that correspond to the SSIDs forbidden to access the WiFi device; and a second access control module configured to: when the determination result of the second determining module is positive, add, at the kernel layer of the WiFi device, a preset tag to the access request based on the SSID, and send the access request with the preset tag added to the first receiving module; if the determination result of the second determining module is negative, not add, at the kernel layer of the WiFi device, the preset tag to the access request based on the SSID, and send the access request without the preset tag added to the first receiving module.

With reference to the second aspect or the first possible implementation manner of the second aspect, in a second possible implementation manner, the WiFi device provided by the present invention may further include: a setting module configured to set, at the user layer of the WiFi device, corresponding tags for the SSIDs forbidden to access the WiFi device.

In a third aspect, the present invention provides a WiFi device, which may include a memory and a processor, where the memory stores a specified program and the processor invokes the program stored in the memory to execute the following steps: receiving, at a user layer of the WiFi device, an access request for accessing the WiFi device based on a SSID, where the access request includes a request for accessing a management interface WEBUI of the WiFi device; and determining, at the user layer of the WiFi device, whether a tag of the received access request is the same as one of tags that are preset for SSIDs forbidden to access the WiFi device; if the determination result is positive, rejecting the access request; if the determination result is negative, accepting the access request.

With reference to the third aspect, in a first possible implementation manner, before determining, at the user layer of the WiFi device, whether a tag of the received access request is the same as one of tags that are preset for the SSIDs forbidden to access the WiFi device, the processor further executes the following steps: obtaining, at a kernel layer of the WiFi device and in a Multi-SSID, index values of interfaces that correspond to the SSIDs forbidden to access the WiFi device; when receiving, at the kernel layer of the WiFi device, an access request for accessing the WiFi device based on a SSID, determining whether an index value of an interface that corresponds to the SSID on which the access request is based matches one of the index values of the interfaces that correspond to the SSIDs forbidden to access the WiFi device; and if the determination result is positive, adding, at the kernel layer of the WiFi device, a preset tag to the access request based on the SSID, and sending the access request with the preset tag to the user layer of the WiFi device; if the determination result is negative, not adding, at the kernel layer of the WiFi device, the preset tag to the access request based on the SSID, and sending the access request without the preset tag added to the user layer of the WiFi device.

With reference to the third aspect or the first possible implementation manner of the third aspect, in a second possible implementation manner, before receiving, at a user layer of the WiFi device, an access request for accessing the WiFi device based on a SSID, the processor further executes the following steps: setting, at the user layer of the WiFi device, corresponding tags for the SSIDs forbidden to access the WiFi device.

It can be seen from the above that in some feasible implementation manners of the present invention, an access request for accessing the WiFi device based on a SSID is received at a user layer of the WiFi device, where the access request includes a request for accessing a management interface WEBUI of the WiFi device; whether a tag of the received access request is the same as one of tags that are preset for SSIDs forbidden to access the WiFi device is determined at the user layer of the WiFi device; if the determination result is positive, the access request is rejected; if the determination result is negative, the access request is accepted. Therefore, in the embodiments of the present invention, the access request for accessing the WiFi device can be managed only by using a tag, which effectively reduces a processing time in querying an IP/MAC mapping table and a MAC table of users associated with SSIDs forbidden to access the WEBUI, thereby increasing processing efficiency. In addition, in the embodiments of the present invention, management and access are based on an SSID rather than a MAC address of a user, so that when the user is changed, user rights are still correct. Furthermore, in the embodiments of the present invention, potential network security risks are avoided when the user sets a static IP, thereby improving user experience.

DETAILED DESCRIPTION OF THE EMBODIMENTS

To make the objectives, technical solutions, and advantages of the present invention more clearly, the following further describes the present invention in detail with reference to the accompanying drawings.

Figure 1:
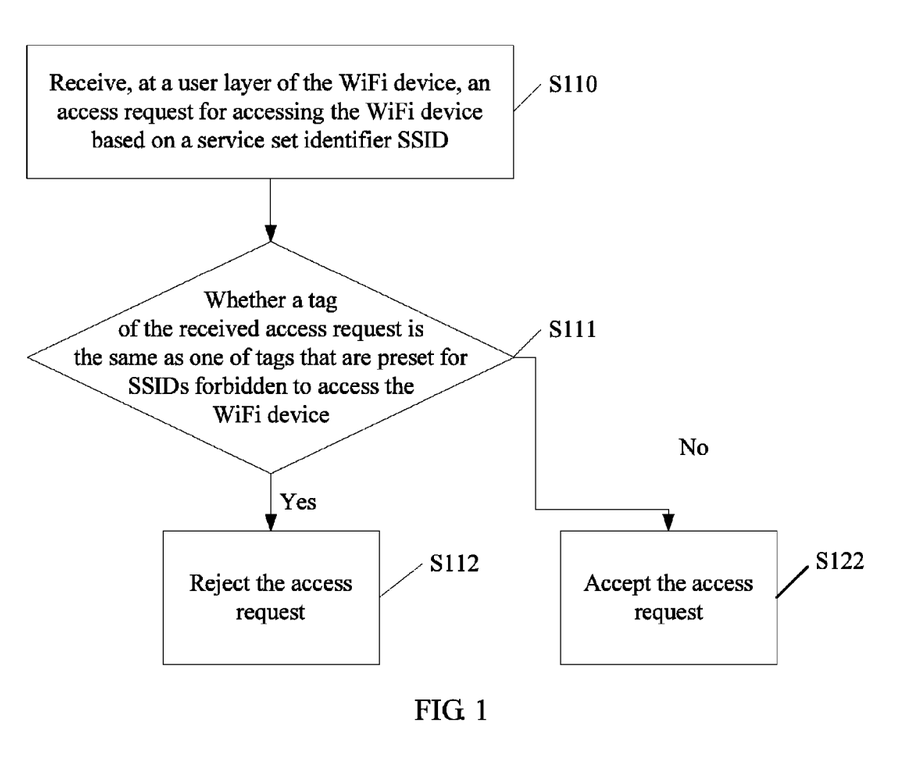
FIG. 1 is a schematic flowchart of an embodiment of an access control method for a WiFi device according to the present invention.

FIG. 1 is a schematic flowchart of an embodiment of an access control method for a WiFi device according to the present invention. As shown in FIG. 1, the method provided in this embodiment of the present invention includes the following steps:

Step S110: Receive, at a user layer of the WiFi device, an access request for accessing the WiFi device based on a SSID, where the access request includes a request for accessing a management interface WEBUI of the WiFi device.

Step S111: Determine, at the user layer of the WiFi device, whether a tag of the received access request is the same as one of tags that are preset for SSIDs forbidden to access the WiFi device; if the determination result is positive, step S112 is executed; if the determination result is negative, step S122 is executed.

Step S112: Reject the access request.

Step S122: Accept the access request.

During specific implementation, a user layer provided in this embodiment of the present invention may include a platform layer, a protocol layer, and an application layer. A kernel layer provided in this embodiment of the present invention may include the operating system part.

During the specific implementation, the access request received in step S110 may be an access request for logging in to or maintaining the management interface of the WiFi device, where the access request may be a Hypertext Transfer Protocol (HTTP) packet, a File Transfer Protocol (FTP) packet, and the like.

During the specific implementation, a tag and an access request filtering rule may be set in advance, at the user layer of the WiFi device and by using a firewall setting process, for SSIDs forbidden to access the WiFi device. For example, assuming that an SSID forbidden to access the WiFi device is SSID2, a SetSSID2AccessRule (a user-defined function name, which may be set to other names according to requirements) function may be invoked at the user layer of the WiFi device to set a firewall rule, where the function can insert or delete the access request filtering rule according to an enable/disable parameter, for example, the set filtering rule may be as follows: reject an access request with a tag 0xfff1. In this case, when the WiFi device works in a Multi-SSID mode, in step S111, a tag of the received access request is determined at the user layer of the WiFi device; if the tag is 0xfff1, the access request is discarded (that is, the access is rejected); otherwise, the access request is normally forwarded (that is, the access is accepted).

In some feasible implementation manners of the present invention, an access request for accessing the WiFi device based on a SSID is received at a user layer of the WiFi device, where the access request includes a request for accessing a management interface WEBUI of the WiFi device; whether a tag of the received access request is the same as one of tags that are preset for SSIDs forbidden to access the WiFi device is determined at the user layer of the WiFi device; if the determination result is positive, the access request is rejected; if the determination result is negative, the access request is accepted. In this embodiment of the present invention, the access request for accessing the WiFi device can be managed only by using a tag, which effectively reduces a processing time in querying an IP/MAC mapping table and a MAC table of users associated with SSIDs forbidden to access the WEBUI, thereby increasing processing efficiency. In addition, in this embodiment of the present invention, management and access are based on an SSID rather than a MAC address of a user, so that when the user is changed, user rights are still correct. Furthermore, in this embodiment of the present invention, potential network security risks are avoided when the user sets a static IP, thereby improving user experience.

Figure 2:
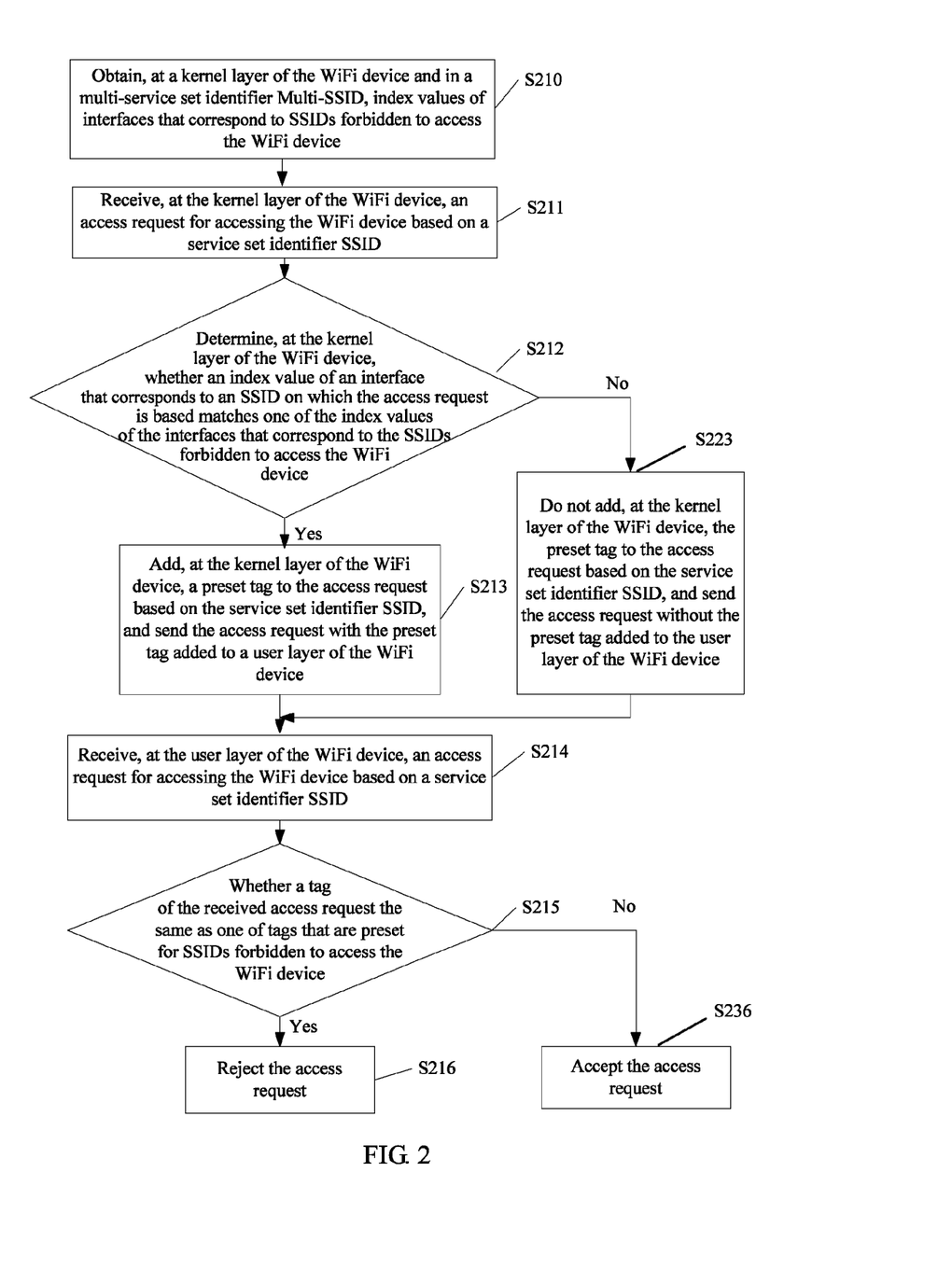
FIG. 2 is a schematic flowchart of another embodiment of an access control method for a WiFi device according to the present invention.

FIG. 2 is a schematic flowchart of an embodiment of an access control method for a WiFi device according to the present invention. On the basis of the embodiment in FIG. 1, a related process performed at a kernel layer of the WiFi device is added. As shown in FIG. 2, the method provided in this embodiment of the present invention includes the following steps:

Step S210: Obtain, at a kernel layer of the WiFi device and in a Multi-SSID, index values of interfaces that correspond to SSIDs forbidden to access the WiFi device.

Step S211: Receive, at the kernel layer of the WiFi device, an access request for accessing the WiFi device based on a SSID.

Step S212: Determine, at the kernel layer of the WiFi device, whether an index value of an interface that corresponds to a SSID on which the access request is based matches one of the index values of the interfaces that correspond to the SSIDs forbidden to access the WiFi device; if the determination result is positive, execute step S213; if the determination result is negative, execute step S223.

Step S213: Add, at the kernel layer of the WiFi device, a preset tag to the access request based on the SSID, and send the access request with the preset tag added to a user layer of the WiFi device.

Step S223: Do not add, at the kernel layer of the WiFi device, the preset tag to the access request based on the SSID, and send the access request without the preset tag added to the user layer of the WiFi device.

Step S214: Receive, at the user layer of the WiFi device, an access request for accessing the WiFi device based on a SSID, where the access request includes a request for accessing a management interface WEBUI of the WiFi device.

Step S215: Determine, at the user layer of the WiFi device, whether a tag of the received access request is the same as one of tags that are preset for the SSIDs forbidden to access the WiFi device; if the determination result is positive, execute step S216; if the determination result is negative, execute step S236.

Step S216: Reject the access request.

Step S236: Accept the access request.

During the specific implementation, access rights may be set, at the user layer of the WiFi device, for each SSID that accesses the WiFi device. In particular, for SSIDs forbidden to access the WiFi device, accessing the WiFi device needs to be forbidden. For example, assuming that an SSID forbidden to access the WiFi device is SSID2, an EnableSsid2AccessUI (a user-defined interface name, which may be set to other names according to requirements) interface may be added to a wlan_api.c file at the user layer for an application module at the user layer to invoke. In this case, the application module at the user layer can transfer an enable/disable parameter by using this interface to record a value of rights of this SSID, where the default recording parameter is forbidden access, which indicates it is forbidden to send an access request for accessing the WiFi device based on the SSID2. In addition, the application module determines, according to the enable/disable parameter, whether to write, at the user layer, an index value of an interface that corresponds to SSID2, for example, an index value ifindex of an interface eth1, to an ssid2 Proc (a user-defined file name, which may be set to other names according to needs) file; if the parameter indicates that the SSID2 is forbidden to access the WiFi device, the index value of the interface that corresponds to the SSID2 needs to be written to the ssid2 Proc file; if the parameter indicates that the SSID2 is allowed to access the WiFi device, an invalid value, that is, an index value of none of interfaces, needs to be written to the ssid2 Proc file.

Therefore, in step S210, the index value of the interface may be read, at the kernel layer of the WiFi device, from the ssid2 Proc file to obtain the index value of the interface that corresponds to the SSID2 forbidden to access the WiFi device.

In step S211 and step S212, when an access request for accessing the WiFi device based on a SSID is received at the kernel layer of the WiFi device, before the access request is forwarded from the kernel layer to the user layer, whether an index value of an interface that corresponds to the SSID on which the access request is based matches one of the index values of the interfaces that correspond to the SSIDs forbidden to access the WiFi device is determined at the kernel layer of the WiFi device; if the determination result is positive, step S213 is executed; if the determination result is negative, step S223 is executed. Still with reference to the foregoing example, in step S212, in a forwarding process at the kernel layer, whether the index value ifindex of a current forwarding interface of the WiFi device is equal to the ifindex obtained from the ssid2 Proc file is determined (for example, the determination is made in a br_pass_frame_up (struct sk_buff*skb) function of the br_input.c file); if the index value ifindex of the current forwarding interface of the WiFi device is equal to the value obtained from the ssid2 Proc file, in step S213, a preset tag (for example, the added tag is 0xfff1) is added to the access request based on the SSID2; if the index value ifindex of the forwarding interface of the WiFi device is not equal to the value obtained from the ssid2 Proc file, the operation of adding a tag is skipped, and a standard process is executed, that is, the access request is forwarded directly.

In this case, in step S215, a tag of the received access request is determined at the user layer of the WiFi device; if the tag is 0xfff1, the access request is discarded (that is, the access is rejected); otherwise, the access request is normally forwarded (that is, the access is accepted).

It can be seen from the above that in some feasible implementation manners of the present invention, an access request for accessing the WiFi device based on a SSID is received at a user layer of the WiFi device, where the access request includes a request for accessing a management interface WEBUI of the WiFi device; whether a tag of the received access request is the same as one of tags that are preset for SSIDs forbidden to access the WiFi device is determined at the user layer of the WiFi device; if the determination result is positive, the access request is rejected; if the determination result is negative, the access request is accepted. Therefore, in this embodiment of the present invention, the access request for accessing the WiFi device can be managed only by using a tag, which effectively reduces a processing time in querying an IP/MAC mapping table and a MAC table of users associated with SSIDs forbidden to access the WEBUI, thereby increasing processing efficiency. In addition, in this embodiment of the present invention, management and access are based on an SSID rather than a MAC address of a user, so that when the user is changed, user rights are still correct. Furthermore, in this embodiment of the present invention, potential network security risks are avoided when the user sets a static IP, thereby improving user experience.

Figure 3:
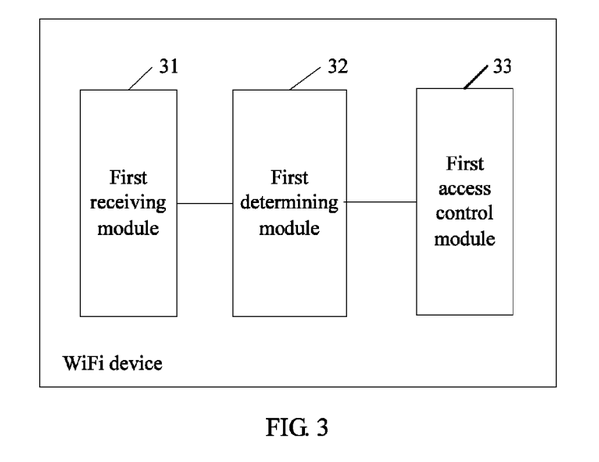
FIG. 3 is a schematic structural diagram of an embodiment of a WiFi device according to the present invention.

Accordingly, the embodiments of the present invention also provide apparatus embodiments of a WiFi device that can be configured to implement the foregoing method embodiments. FIG. 3 is a schematic structural diagram of an embodiment of a WiFi device according to the present invention. As shown in FIG. 3, the WiFi device provided in this embodiment of the present invention may include a first receiving module 31, a first determining module 32, and a first access control module 33, where: the first receiving module 31 is configured to receive, at a user layer of the WiFi device, an access request for accessing the WiFi device based on a SSID, where the access request includes a request for accessing a management interface WEBUI of the WiFi device; the first determining module 32 is configured to determine, at the user layer of the WiFi device, whether a tag of the received access request is the same as one of tags that are preset for SSIDs forbidden to access the WiFi device; and the first access control module 33 is configured to: when the determination result of the first determining module 32 is positive, reject the access request; when the determination result of the first determining module 32 is negative, accept the access request.

During specific implementation, the access request received by the first receiving module 31 may be an access request for logging in to or maintaining the management interface of the WiFi device, where the access request may be an HTTP packet, a FTP packet, and the like.

During the specific implementation, the WiFi device provided in this embodiment of the present invention may further include a setting module configured to preset, at the user layer of the WiFi device, a corresponding tag filtering rule for the SSIDs forbidden to access the WiFi device. For example, the setting module may set in advance, by using a firewall setting process and at the user layer of the WiFi device, a corresponding tag and an access request filtering rule for the SSIDs forbidden to access the WiFi device. For example, assuming that an SSID forbidden to access the WiFi device is SSID2, the setting module may set a firewall rule by invoking a SetSSID2AccessRule (a user-defined function name, which may be set to other names according to requirements) function at the user layer of the WiFi device, where the function can insert or delete the access request filtering rule according to an enable/disable parameter, for example, the set filtering rule may be as follows: reject an access request with a tag 0xfff1. In this case, when the WiFi device works in a Multi-SSID mode, the first determining module 32 determines a tag of the received access request at the user layer of the WiFi device; if the tag is 0xfff1, the access request is discarded (that is, the access is rejected); otherwise, the access request is normally forwarded (that is, the access is accepted).

It can be seen from the above that in some feasible implementation manners of the present invention, an access request for accessing the WiFi device based on a SSID is received at a user layer of the WiFi device, where the access request includes a request for accessing a management interface WEBUI of the WiFi device; whether a tag of the received access request is the same as one of tags that are preset for SSIDs forbidden to access the WiFi device is determined at the user layer of the WiFi device; if the determination result is positive, the access request is rejected; if the determination result is negative, the access request is accepted. Therefore, in this embodiment of the present invention, the access request for accessing the WiFi device can be managed only by using a tag, which effectively reduces a processing time in querying an IP/MAC mapping table and a MAC table of users associated with SSIDs forbidden to access the WEBUI, thereby increasing processing efficiency. In addition, in this embodiment of the present invention, management and access are based on an SSID rather than a MAC address of a user, so that when the user is changed, user rights are still correct. Furthermore, in this embodiment of the present invention, potential network security risks are avoided when the user sets a static IP, thereby improving user experience.

Figure 4:
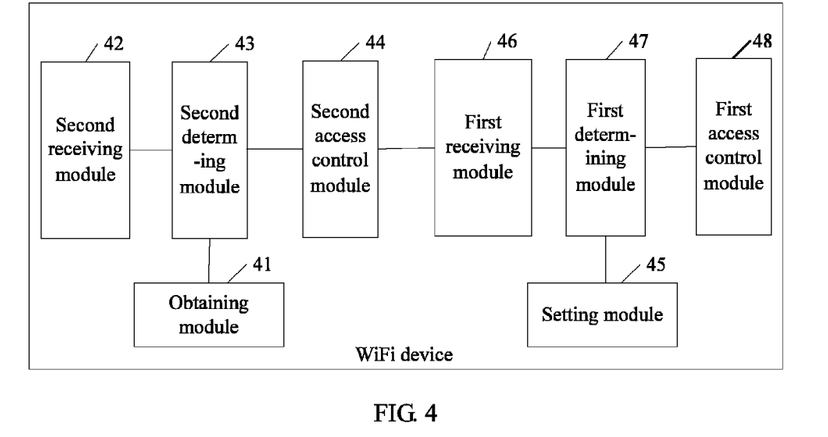
FIG. 4 is a schematic structural diagram of another embodiment of a WiFi device according to the present invention.

FIG. 4 is a schematic structural diagram of another embodiment of a WiFi device according to the present invention. As shown in FIG. 4, the WiFi device provided in this embodiment of the present invention may include an obtaining module 41, a second receiving module 42, a second determining module 43, a second access control module 44, a setting module 45, a first receiving module 46, a first determining module 47, and a first access control module 48, where: the obtaining module 41 is configured to obtain, at a kernel layer of the WiFi device and in a Multi-SSID, index values of interfaces that correspond to SSIDs forbidden to access the WiFi device; the second receiving module 42 is configured to receive, at the kernel layer of the WiFi device, an access request for accessing the WiFi device based on a SSID; the second determining module 43 is configured to: when the second receiving module 42 receives the access request for accessing the WiFi device based on the SSID, determine whether an index value of an interface that corresponds to the SSID on which the access request is based matches one of the index values of the interfaces that correspond to the SSIDs forbidden to access the WiFi device; the second access control module 44 is configured to: if the determination result of the second determining module 43 is positive, add, at the kernel layer of the WiFi device, a preset tag to the access request based on the SSID, and send the access request with the preset tag added to the first receiving module 46; if the determination result of the second determining module 43 is negative, not add, at the kernel layer, the preset tag to the access request based on the SSID, and send the access request without the preset tag added to the first receiving module 46; the setting module 45 is configured to preset, at a user layer of the WiFi device, corresponding tags for the SSIDs forbidden to access the WiFi device; the first receiving module 46 is configured to receive, at the user layer of the WiFi device, an access request for accessing the WiFi device based on a SSID, where the access request includes a request for accessing a management interface WEBUI of the WiFi device; the first determining module 47 is configured to determine, at the user layer of the WiFi device, whether a tag of the received access request is the same as one of tags that are preset for the SSIDs forbidden to access the WiFi device; and the first access control module 48 is configured to: when the determination result of the first determining module 47 is positive, reject the access request; when the determination result of the first determining module 47 is negative, accept the access request.

During specific implementation, access rights may be set, at the user layer of the WiFi device, for each SSID that accesses the WiFi device. In particular, for SSIDs forbidden to access the WiFi device, accessing the WiFi device needs to be forbidden. For example, assuming that an SSID forbidden to access the WiFi device is SSID2, an EnableSsid2AccessUI (a user-defined interface name, which may be set to other names according to requirements) interface may be added to a wlan_api.c file at the user layer for an application module at the user layer to invoke. In this case, the application module at the user layer can transfer an enable/disable parameter by using this interface to record a value of rights of this SSID, where the default recording parameter is forbidden access, which indicates it is forbidden to send an access request for accessing the WiFi device based on the SSID2. In addition, the application module determines, according to the enable/disable parameter, whether to write, at the user layer, an index value of an interface that corresponds to SSID2, for example, an index value ifindex of an interface eth1, to an ssid2 Proc (a user-defined file name, which may be set to other names according to needs) file; if the parameter indicates that the SSID2 is forbidden to access the WiFi device, the index value of the interface that corresponds to the SSID2 needs to be written to the ssid2 Proc file; if the parameter indicates that the SSID2 is allowed to access the WiFi device, an invalid value, that is, an index value of none of interfaces, needs to be written to the ssid2 Proc file.

Therefore, the obtaining module 41 in this embodiment of the present invention can read, at the kernel layer of the WiFi device, the ssid2 Proc file of the user layer to obtain the index value of the interface that corresponds to the SSID2 forbidden to access the WiFi device. The foregoing process of writing the index value of the interface that corresponds to the SSID2 to the ssid2 Proc file is an example only. In other embodiments, index values of interfaces that correspond to SSIDs may be transferred, in other manners, from the user layer to the kernel layer, and the kernel layer can store, in other manners, the index values of the interfaces that correspond to the SSIDs forbidden to access the WiFi device (not limited to the SSID2, and including all SSIDs forbidden to access the WiFi device).

When the second receiving module 42 receives, at the kernel layer of the WiFi device, an access request for accessing the WiFi device based on a SSID, before the access request is forwarded from the kernel layer to the user layer, the second determining module 43 determines whether an index value of an interface that corresponds to the SSID on which the access request is based matches one of the index values of the interfaces that correspond to the SSIDs forbidden to access the WiFi device. Still using the SSID2 as an example, the second determining module 43 can determine (for example, make determination in a br_pass_frame_up(struct sk_buff*skb) function of a br_input.c file) whether an index value ifindex of a current SSID forwarding interface is equal to an ifindex obtained from the ssid2 Proc file; if the index value ifindex of the current interface that forwards the SSID is equal to the ifindex obtained from the ssid2 Proc file, the second access control module 44 adds a preset tag (the tag is preset by the setting module 45, for example, a tag 0xfff1; the setting module 45 has the same function as the setting module in the foregoing embodiment, which is not described herein) to an access request based on the SSID2; if the index value ifindex of the current interface that forwards the SSID is equal to the ifindex obtained from the ssid2 Proc file, the operation of adding a tag is skipped, and a standard process is executed, that is, the access request is forwarded directly.

In this case, the first receiving module 46 can receive, at the user layer, the access request from the second access control module 44, and the first determining module 47 determines, at the user layer of the WiFi device, a tag of the received access request; if the tag is 0xfff1, the access request is discarded (that is, the access is rejected); otherwise, the access request is normally forwarded (that is, the access is accepted).

It can be seen from the above that in some feasible implementation manners of the present invention, an access request for accessing the WiFi device based on a SSID is received at a user layer of the WiFi device, where the access request includes a request for accessing a management interface WEBUI of the WiFi device; whether a tag of the received access request is the same as one of tags that are preset for SSIDs forbidden to access the WiFi device is determined at the user layer of the WiFi device; if the determination result is positive, the access request is rejected; if the determination result is negative, the access request is accepted. Therefore, in this embodiment of the present invention, the access request for accessing the WiFi device can be managed only by using a tag, which effectively reduces a processing time in querying an IP/MAC mapping table and a MAC table of users associated with SSIDs forbidden to access the WEBUI, thereby increasing processing efficiency. In addition, in this embodiment of the present invention, management and access are based on an SSID rather than a MAC address of a user, so that when the user is changed, user rights are still correct. Furthermore, in this embodiment of the present invention, potential network security risks are avoided when the user sets a static IP, thereby improving user experience.

Figure 5:
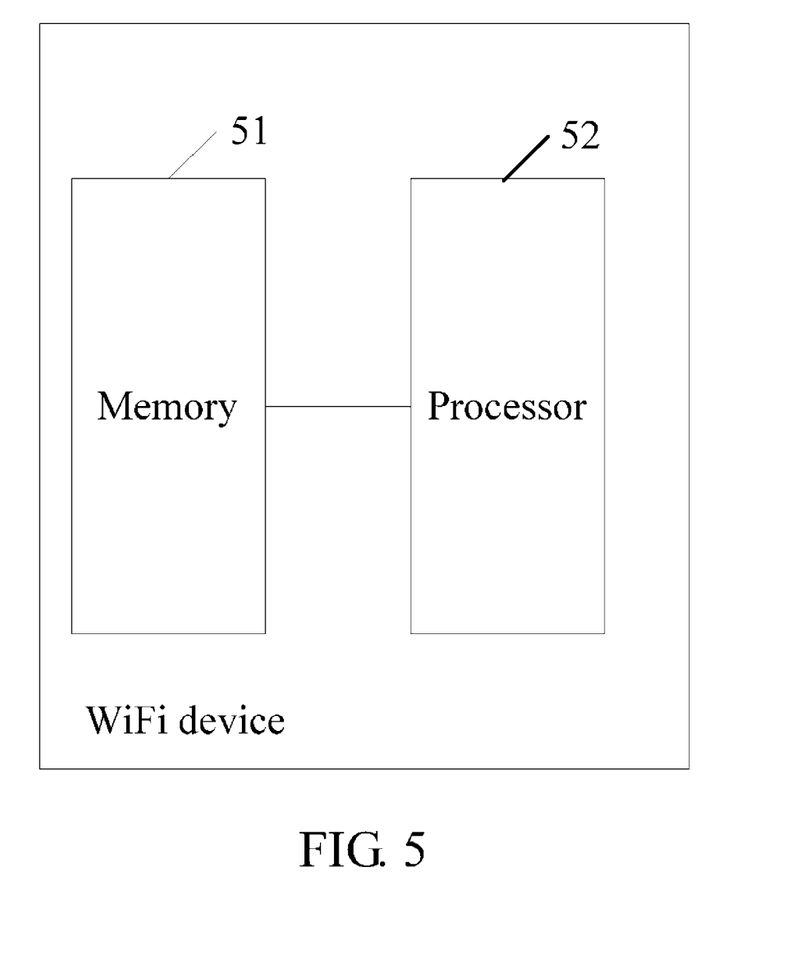
FIG. 5 is a schematic structural diagram of another embodiment of a WiFi device according to the present invention.

FIG. 5 is a schematic structural diagram of another embodiment of a WiFi device according to the present invention. As shown in FIG. 5, the WiFi device provided in this embodiment of the present invention may include a memory 51 and a processor 52, where the memory 51 stores a specified program and the processor 52 invokes the program stored in the memory 51 to execute the following steps: receiving, at a user layer of the WiFi device, an access request for accessing the WiFi device based on a SSID, where the access request includes a request for accessing a management interface WEBUI of the WiFi device; and determining, at the user layer of the WiFi device, whether a tag of the received access request is the same as one of tags that are preset for SSIDs forbidden to access the WiFi device; if the determination result is positive, rejecting the access request; if the determination result is negative, accepting the access request.

In some feasible implementation manners, before determining, at the user layer of the WiFi device, whether a tag of the received access request is the same as one of tags that are preset for SSIDs forbidden to access the WiFi device, the processor 52 further executes the following steps: obtaining, at a kernel layer of the WiFi device and in a Multi-SSID, index values of interfaces that correspond to the SSIDs forbidden to access the WiFi device; when receiving an access request for accessing the WiFi device based on a SSID at the kernel layer of the WiFi device, determining whether an index value of an interface that corresponds to the SSID on which the access request is based matches one of the index values of the interfaces that correspond to the SSIDs forbidden to access the WiFi device; and if the determination result is positive, adding, at the kernel layer of the WiFi device, a preset tag to the access request based on the SSID, and sending the access request with the preset tag added to the user layer of the WiFi device; if the determination result is negative, not adding, at the kernel layer of the WiFi device, a preset tag to the access request based on the SSID, and sending the access request without the preset tag added to the user layer of the WiFi device.

In some feasible implementation manners, before receiving an access request for accessing the WiFi device based on a SSID at the user layer of the WiFi device, the processor 52 further executes the following steps: presetting, at the user layer of the WiFi device, corresponding tags for the SSIDs forbidden to access the WiFi device.

The foregoing descriptions are merely exemplary embodiments of the present invention, but are not intended to limit the present invention. Any equivalent modifications made according to the claims of the present invention still fall within the scope of the present invention

What is claimed is:

1. An access control method for a wireless fidelity (WiFi) device supporting a multi service set identifier (SSID) (Multi-SSID), wherein there is one or more terminal associated with each SSID, comprising:
   receiving, from a terminal associated with a SSID in the Multi-SSID, at a user layer of the WiFi device, an access request for accessing the WiFi device based on the SSID, wherein the access request comprises a request for accessing a management interface web user interface (WEBUI) residing on the WiFi device and with one of one or more preset tags added at the kernel layer of the WiFi device;
   determining, at the user layer of the WiFi device, whether a tag received with the access request is the same as one of one or more preset tags that are preset for one or more SSIDs forbidden to access the WEBUI residing on the WiFi device;
   rejecting the access request when the determination result is positive; and
   accepting the access request when the determination result is negative.

2. The access control method according to claim 1, wherein before the receiving, at the user layer of the WiFi device, the access request for accessing the WiFi device based on the SSID, the method further comprises setting, at the user layer of the WiFi device, one or more corresponding tags for the SSIDs forbidden to access the WEBUI residing on the WiFi device.

3. An access control method for a wireless fidelity (WiFi) device supporting a multi service set identifier (SSID) (Multi-SSID), wherein there is one or more terminal associated with each SSID, comprising:
   obtaining, at a kernel layer of the WiFi device, one or more index values of interfaces that represent one or more locations of SSIDs in the Multi-SSID that are forbidden to access a management interface web user interface (WEBUI) residing on the WiFi device;
   receiving, from a terminal associated with a SSID in the Multi-SSID, at the kernel layer of the WiFi device, an access request for accessing the WiFi device based on the SSID, wherein the access request comprises a request for accessing the WEBUI;
   determining whether an index value of the interface that corresponds to the SSID on which the access request is based matches one of the index values of the interfaces that correspond to the SSIDs forbidden to access the WEBUI when receiving the access request at the kernel layer of the WiFi device;
   adding, at the kernel layer of the WiFi device, one of one or more preset tags to the access request based on the SSID when the determination result is positive;
   sending the access request with the one of the one or more preset tags added to a user layer of the WiFi device;
   receiving, at the user layer of the WiFi device, the access request with the one of the one or more preset tags added;
   determining, at the user layer of the WiFi device, whether a tag of the access request is the same as one of one or more preset tags that are preset for one or more SSIDs forbidden to access the WEBUI;
   rejecting the access request when the determination result is positive; and
   accepting the access request when the determination result is negative.

4. The access control method according to claim 3, wherein before the receiving, at the user layer of the WiFi device, the access request for accessing the WiFi device based on the SSID, the method further comprises setting, at the user layer of the WiFi device, one or more corresponding tags for the SSIDs forbidden to access the WEBUI residing on the WiFi device.

5. The access control method according to claim 3, wherein the method further comprising:
not adding, at the kernel layer of the WiFi device, the one of the one or more preset tags to the access request based on the SSID when the determination result is negative;
sending the access request without the one of the preset tags added to the user layer of the WiFi device.

6. A wireless fidelity (WiFi) device supporting a multi service set identifier (SSID) (Multi-SSID), wherein there is one or more terminals associated with each SSID, comprising:
a memory; and
a processor, wherein the memory stores a specified instructions and the processor invokes the instructions stored in the memory to execute by the processor to cause the WiFi device to perform the following:
receive, from a terminal associated with a SSID in the Multi-SSID, at a user layer of the WiFi device, an access request for accessing the WiFi device based on the SSID, wherein the access request comprises a request for accessing a management interface web user interface (WEBUI) residing on the WiFi device and with one of one or more preset tags added at the kernel layer of the WiFi device;
determine, at the user layer of the WiFi device, whether a tag received with the access request is the same as one of one or more preset tags that are preset for one or more SSIDs forbidden to access the WEBUI residing on the WiFi device;
reject the access request when the determination result is positive; and
accept the access request when the determination result is negative.

7. The WiFi device according to claim 6, wherein before receiving, at the user layer of the WiFi device, the access request for accessing the WiFi device based on the SSID, the instructions executed by the processor further cause the WiFi device to: set, at the user layer of the WiFi device, one or more corresponding tags for the SSIDs forbidden to access the WEBUI residing on the WiFi device.

8. A wireless fidelity (WiFi) device supporting a multi service set identifier (SSID) (Multi-SSID), wherein there is one or more terminal associated with each SSID, comprising:
a memory; and
a processor, wherein the memory stores specified instructions and the processor invokes the instructions stored in the memory to execute by the processor to cause the WiFi device to perform the following:
obtain, at a kernel layer of the WiFi device, one or more index values of interfaces that represent one or more locations of SSIDs in the Multi-SSID that are forbidden to access the WiFi device;
receive, from a terminal associated with a SSID in the Multi-SSID, at the kernel layer of the WiFi device, an access request for accessing the WiFi device based on the SSID, wherein the access request comprises a request for accessing the WEBUI;
determine whether an index value of an interface that corresponds to the SSID on which the access request is based matches one of the index values of the interfaces that correspond to the SSIDs forbidden to access the WEBUI when the access request is received at the kernel layer of the WiFi device;
add, at the kernel layer of the WiFi device, one of one or more preset tags to the access request based on the SSID when the determination result is positive;
send the access request with the one of the one or more preset tags added to a user layer of the WiFi device;
receive, at the user layer of the WiFi device, the access request with the one of the one or more preset tags added;
determine, at the user layer of the WiFi device, whether the tag of the access request is the same as one of one or more preset tags that are preset for one or more SSIDs forbidden to access the WEBUI;
reject the access request when the determination result is positive; and
accept the access request when the determination result is negative.

9. The WiFi device according to claim 8, wherein before receiving, at a user layer of the WiFi device, an access request for accessing the WiFi device based on a SSID, the instructions executed by the processor further cause the WiFi device to set, at the user layer of the WiFi device, one or more corresponding tags for the SSIDs forbidden to access the WEBUI residing on the WiFi device.

10. The WiFi device according to claim 8, wherein the instructions executed by the processor further cause the WiFi device to not add, at the kernel layer of the WiFi device, one of the one or more preset tags to the access request based on the SSID when the determination result is negative; and
send the access request without the one of the preset tags added to the user layer of the WiFi device.

* * * * *

UNITED STATES PATENT AND TRADEMARK OFFICE
CERTIFICATE OF CORRECTION

PATENT NO. : 9,467,932 B2  
APPLICATION NO. : 14/145234  
DATED : October 11, 2016  
INVENTOR(S) : Chao Xiang Page 1 of 1

It is certified that error appears in the above-identified patent and that said Letters Patent is hereby corrected as shown below:

On the Title Page

Column 1; Inventor should read:  
Inventor: Chao Xiang, Xi'an (CN)

Signed and Sealed this  
Twenty-first Day of February, 2017

Michelle K. Lee  
*Director of the United States Patent and Trademark Office*